US010260545B2

(12) United States Patent
Obitts et al.

(10) Patent No.: US 10,260,545 B2
(45) Date of Patent: Apr. 16, 2019

(54) LATCH ASSEMBLY FOR SECURING TRACKS AND DIVIDERS TO A FRONT RAIL

(71) Applicant: Fasteners for Retail, Inc., Twinsburg, OH (US)

(72) Inventors: Shane Obitts, Elyria, OH (US); Gerald Matthew Szpak, Brecksville, OH (US)

(73) Assignee: Fasteners for Retail, Inc., Twinsburg, OH (US)

( * ) Notice: Subject to any disclaimer, the term of this patent is extended or adjusted under 35 U.S.C. 154(b) by 853 days.

(21) Appl. No.: 14/884,421

(22) Filed: Oct. 15, 2015

(65) Prior Publication Data

US 2016/0029794 A1  Feb. 4, 2016

Related U.S. Application Data

(63) Continuation-in-part of application No. 14/247,531, filed on Apr. 8, 2014, now Pat. No. 9,357,841.

(60) Provisional application No. 61/809,720, filed on Apr. 8, 2013.

(51) Int. Cl.
*F16B 12/26* (2006.01)
*A47F 5/00* (2006.01)
*A47B 57/58* (2006.01)
*A47F 1/12* (2006.01)

(52) U.S. Cl.
CPC .............. *F16B 12/26* (2013.01); *A47B 57/58* (2013.01); *A47F 5/005* (2013.01); *A47F 1/125* (2013.01); *Y10T 29/49876* (2015.01)

(58) Field of Classification Search
CPC ..... A47B 57/58; A47B 57/583; A47B 57/585; A47B 57/586
See application file for complete search history.

(56) References Cited

U.S. PATENT DOCUMENTS

| 3,501,019 A | 3/1970 | Armstrong et al. |
| 3,559,815 A | 2/1971 | Huddleston |
| 3,579,710 A * | 5/1971 | Gartzke ................ A47B 57/26 16/93 R |
| 3,746,295 A | 7/1973 | Stepanek et al. |
| 3,750,894 A | 8/1973 | Jensen et al. |

(Continued)

FOREIGN PATENT DOCUMENTS

| EP | 1514493 A1 * | 3/2005 | .......... A47B 57/585 |
| EP | 3053488 A1 * | 8/2016 | ............. A47F 5/005 |

*Primary Examiner* — Daniel J Wiley
(74) *Attorney, Agent, or Firm* — Honigman LLP

(57) ABSTRACT

A connector assembly which is adapted to selectively attach a cooperating member to a rail of a merchandising shelf includes a U-shaped lip including a first end and an opposite second end such that the first end is adapted to be selectively attached to the cooperating member and the second end is adapted to be selectively attached to the rail. The clip includes a first arm, a second arm and a bridge portion joining the two arms. The clip includes a resilient material and wherein the first arm is spaced from the second arm such that the first arm is movable in relation to the second arm. A protrusion extends in a direction generally perpendicular to a plane of the first arm. The protrusion includes a section configured to selectively cooperate with an engagement portion of the rail. The first engagement portion of the rail includes a layer of a flexible thermoplastic material having a Shore A hardness of less than 75.

19 Claims, 10 Drawing Sheets

(56) References Cited

U.S. PATENT DOCUMENTS

| | | | | |
|---|---|---|---|---|
| 3,868,021 | A | * | 2/1975 | Heinrich .............. A47B 57/585 211/184 |
| 3,872,976 | A | | 3/1975 | Moore et al. |
| 3,893,739 | A | | 7/1975 | Bernard |
| 4,606,464 | A | | 8/1986 | Jordan et al. |
| 4,615,276 | A | * | 10/1986 | Garabedian ............. A47F 5/005 108/61 |
| 4,712,694 | A | * | 12/1987 | Breslow .................. A47F 5/005 108/61 |
| 4,736,997 | A | | 4/1988 | Besore et al. |
| 4,762,236 | A | * | 8/1988 | Jackle, III ............... A47F 1/126 211/59.3 |
| 4,775,058 | A | * | 10/1988 | Yatsko .................... A47F 5/005 108/61 |
| 4,881,707 | A | * | 11/1989 | Garfinkle .................. G09F 7/22 248/222.12 |
| 5,217,124 | A | | 6/1993 | Stone |
| 5,275,297 | A | | 1/1994 | Dokoupil et al. |
| 5,381,908 | A | * | 1/1995 | Hepp ................. A47B 57/585 108/61 |
| 5,682,824 | A | * | 11/1997 | Visk ........................ A47F 5/005 108/60 |
| 5,971,173 | A | * | 10/1999 | Valiulis .................... A47F 5/005 211/184 |
| 6,299,004 | B1 | * | 10/2001 | Thalenfeld ................ A47F 1/12 211/184 |
| 6,305,559 | B1 | * | 10/2001 | Hardy ..................... A47F 5/005 211/184 |
| 6,438,882 | B1 | * | 8/2002 | Reynolds .................. G09F 3/18 248/231.21 |
| 6,484,891 | B2 | * | 11/2002 | Burke ...................... A47F 1/126 211/184 |
| 6,598,754 | B2 | | 7/2003 | Weiler |
| 7,216,770 | B2 | * | 5/2007 | Mueller .................. A47F 1/126 211/59.3 |
| 7,395,938 | B2 | * | 7/2008 | Merit ...................... A47F 5/005 211/184 |
| 7,641,057 | B2 | * | 1/2010 | Mueller .................. A47F 1/126 206/221 |
| 7,784,623 | B2 | | 8/2010 | Mueller et al. |
| 7,934,609 | B2 | | 5/2011 | Alves et al. |
| 7,971,735 | B2 | | 7/2011 | Mueller et al. |
| 8,069,998 | B2 | | 12/2011 | Thomas |
| 8,177,076 | B2 | | 5/2012 | Rataiczak, III et al. |
| 8,276,766 | B2 | * | 10/2012 | Rataiczak, III ......... A47F 5/005 211/184 |
| 8,342,340 | B2 | | 1/2013 | Rataiczak, III et al. |
| 8,496,126 | B2 | * | 7/2013 | Mueller .................. A47F 1/126 211/59.3 |
| 8,739,984 | B2 | | 6/2014 | Hardy |
| 9,538,860 | B2 | * | 1/2017 | Brej ........................ A47F 1/126 |
| 2001/0002659 | A1 | * | 6/2001 | Bada ..................... A47B 57/583 211/59.2 |
| 2003/0141265 | A1 | * | 7/2003 | Jo ........................... A47F 1/126 211/59.3 |
| 2004/0124161 | A1 | | 7/2004 | Lau |
| 2005/0044765 | A1 | * | 3/2005 | Ahlund .................. A47F 5/005 40/649 |
| 2005/0139560 | A1 | | 6/2005 | Whiteside et al. |
| 2006/0049122 | A1 | * | 3/2006 | Mueller .................. A47F 1/126 211/59.3 |
| 2006/0260518 | A1 | | 11/2006 | Josefsson et al. |
| 2007/0108146 | A1 | | 5/2007 | Nawrocki |
| 2008/0203256 | A1 | * | 8/2008 | Medcalf .................. A47F 1/126 248/231.81 |
| 2012/0006773 | A1 | | 1/2012 | Mueller et al. |
| 2013/0020270 | A1 | | 1/2013 | Valiulis et al. |
| 2013/0200019 | A1 | | 8/2013 | Hardy et al. |
| 2014/0263134 | A1 | * | 9/2014 | Walker .................... A47F 5/005 211/184 |
| 2014/0305895 | A1 | | 10/2014 | Obitts et al. |

\* cited by examiner

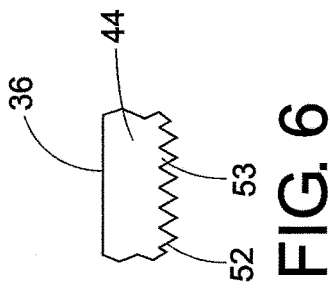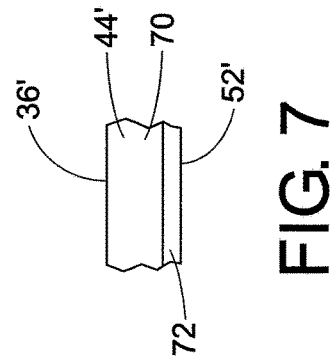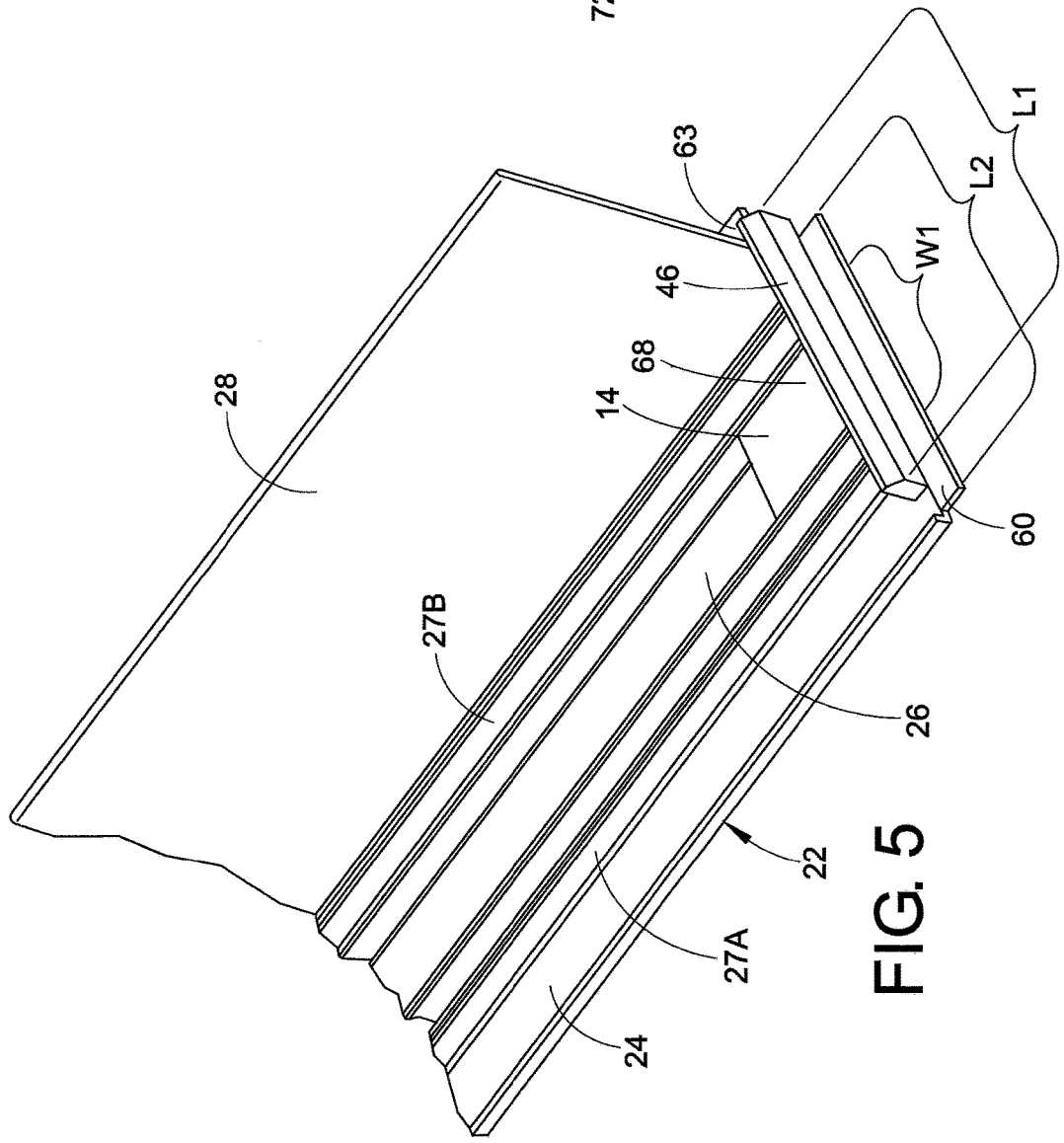

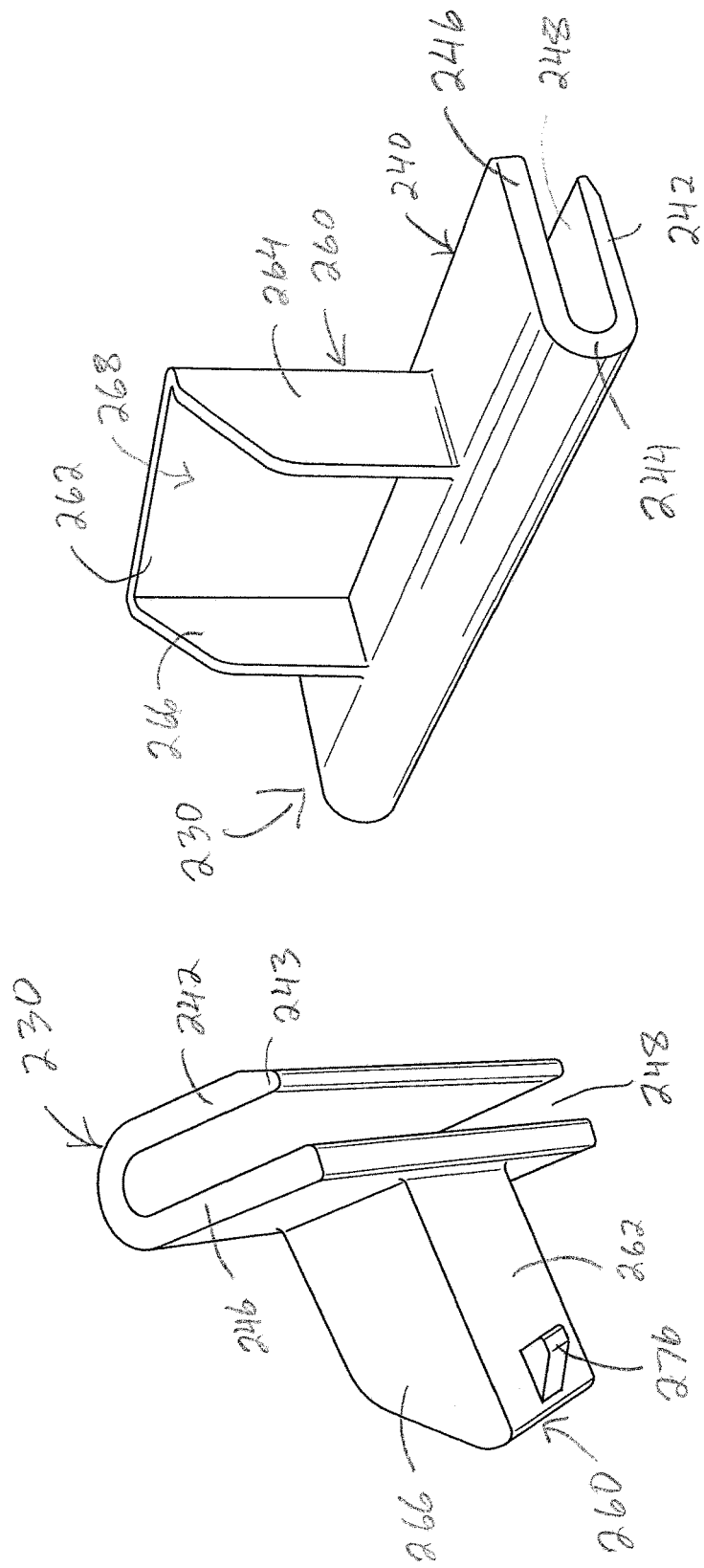

LATCH ASSEMBLY FOR SECURING TRACKS AND DIVIDERS TO A FRONT RAIL

This application is a continuation-in-part of U.S. patent application Ser. No. 14/247,531 which was filed on Apr. 8, 2014. That application, in turn, claims priority from U.S. Provisional Application Ser. No. 61/809,720 dated Apr. 8, 2013.

BACKGROUND

The present disclosure relates to a latch assembly for merchandising shelf systems. It finds particular application in conjunction with a latch for securing tracks or dividers to a front rail of a merchandising shelf system, and will be described with particular reference thereto. However, it is to be appreciated that the present exemplary embodiment is also amenable to other like applications.

Merchandising shelf assemblies are generally arranged to stock, store or display various products or merchandise in a desirable way. Many stores sell various retail items that have various geometric shapes and it is desirable to provide shelf assemblies that are individually configurable to stock, store or display merchandise in arrangements such that the goods are readily accessible to potential purchasers. The shelf assemblies can include forward feed assemblies in which merchandise for sale is placed but can also include dividers that separate the products into columns on the shelf. Both the divider and the forward feed assembly can be connected to a rail or support track placed on the shelf. The rail is often a front rail.

Shelf dividers neatly separate multiple products on a single shelf into columns while pusher tracks urge merchandise forward on the shelf. Dividers and pusher tracks are used to increase sales and enhance presentation so that a shelf looks fully stocked. Multiple sizes and styles are available. In many instances, the pusher tracks and dividers, which can both be termed cooperating members, are mounted to the shelf by an elongated mounting member, such as a rail. The rail can include a vertically oriented wall positioned along a front edge of the shelf to retard product from falling off the shelf. The rail can also include an attachment profile positioned adjacent to the shelf front edge that runs lengthwise along the shelf. Such tracks and dividers, i.e. cooperating members, are adapted to connect to the rail along cooperating attachment profiles.

Generally, the cooperating members can be mounted to rails by positioning the member at one end of the rail and sliding the member along the attachment profile of the rail into a desired position in relation to the length of the shelf. The rail is adapted to mount the cooperating member (track or divider) at a desired location on the shelf and retard movement of the track or divider thereon while also allowing a merchant to adjust the location of the divider or track along the shelf.

There are different attachment profiles that are associated with various existing rails and existing tracks and dividers for merchandising. A problem can exist when a user desires to remove a particular track or divider from the rail or to re-position same along the rail. Such removal or re-positioning may require the removal of other tracks or dividers mounted to the rail. Additionally, the known tracks or dividers are susceptible to being moved out of place due to the presence of side loads imposed thereon.

Therefore, there remains a need to provide an assembly that would assist a merchant to attach, remove or reconfigure individual cooperating members along a longitudinal axis of a rail of a merchandising shelf without having to remove or reconfigure other cooperating members located along the same rail.

BRIEF DESCRIPTION

In one embodiment, the present disclosure pertains to a connector assembly or latch assembly that is adapted to attach a cooperating member to a rail, along a merchandising shelf. The connector assembly comprises a latch member or clip having a first end and an opposite second end such that the first end is adapted to be mounted or attached to the cooperating member and the second end is configured to be selectively attached to the rail. The clip includes a first arm and a second arm with the first arm being spaced from the second arm such that the first arm can be resiliently biased relative to the second arm. An attachment member extends from the first arm and is configured to selectively connect to the rail. A contact surface is configured to be pressed by a user to bias the first arm relative to the second arm to selectively disconnect the attachment member from the rail.

According to another embodiment of the present disclosure, there is provided a connector assembly that is adapted to selectively attach a cooperating member to a rail of a merchandising shelf assembly. The connector assembly comprises a U-shaped clip including a first end and an opposite second end such that the first end is adapted to be selectively attached to the cooperating member and the second end is adapted to be selectively attached to the rail. The clip includes a first arm and a second arm and a bridge portion joining the first arm to the second arm. The clip comprises a resilient material and wherein the first arm is spaced from the second arm such that the first arm is removable in relation to the second arm. A protrusion extends in a direction generally perpendicular to a plane of the first arm. The protrusion includes a section configured to selectively cooperate with a first engagement portion of the rail. The first engagement portion of the rail includes a layer of a flexible thermoplastic material having a Shore A hardness of less than 75.

In accordance with yet another embodiment of the present disclosure, a connector assembly that is adapted to selectively attach a cooperating member to a rail of a merchandising assembly comprises an elongated rail including a surface and a layer of a flexible thermoplastic material having a Shore A hardness of less than 75 mounted to the rail surface. A U-shaped clip includes a first arm, a bridge and a second arm wherein the clip is adapted to be mounted to the cooperating member. A protrusion extends from one of the first and second arms of the clip. The protrusion is adapted to engage the layer of flexible thermoplastic material on the surface of the rail to retard a movement of the cooperating member along a length of the elongated rail.

In accordance with a yet further embodiment of the present disclosure, a method is provided for connecting a track or divider to a rail on a shelf platform with a clip. The method comprises positioning a clip within a channel of the track or divider. The clip includes a first arm spaced from the second arm, wherein the first arm is configured to move relative to the second arm. An attachment member extends from an end of the first arm. The clip is positioned on the shelf platform, along with the track or divider adjacent to a rear side of the rail, such that the attachment member of the first arm is aligned with an elongated flange extending from the rear side of the rail. The first arm is biased away from the second arm such that the attachment member is received within a space defined by the elongated flange and the second side of the rail and an edge of the elongated member at least partially frictionally abuts an abutment surface defined on the first arm.

BRIEF DESCRIPTION OF THE DRAWINGS

The present disclosure may take form in certain parts and arrangements of parts, several embodiments of which will be described in detail in this specification and illustrated in the accompanying drawings which form a part hereof and wherein:

FIG. 5 is a perspective view of the combination track and divider of FIG. 4;

FIG. 6 is an enlarged rear elevational fragmentary view of a portion of the rail elongated member illustrating one embodiment of the edge thereof;

FIG. 7 is a rear elevational view of a portion of a portion of an elongated member of a rail illustrating another embodiment of the present disclosure;

FIG. 13 is an enlarged bottom perspective view of a connector employed with the rear rail of FIG. 12; and FIG. 14 is a top perspective view of the connector of FIG. 13.

DETAILED DESCRIPTION

It is to be understood that the detailed figures are for purposes of illustrating exemplary embodiments of the present disclosure only and are not intended to be limiting. Additionally, it will be appreciated that the drawings are not to scale and that portions of certain elements may be exaggerated for the purpose of clarity and ease of illustration.

Figure 1:
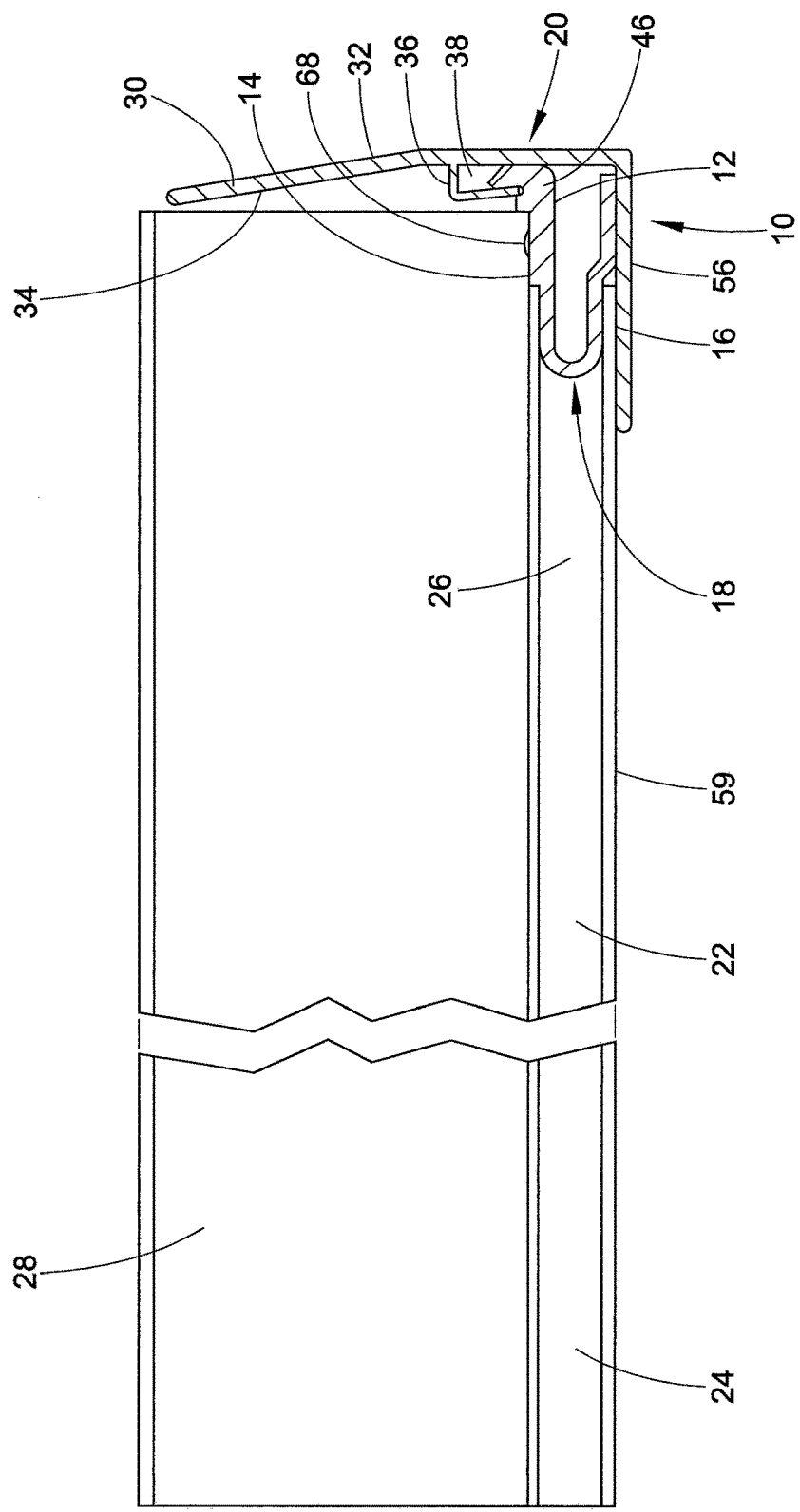
FIG. 1 is a side elevational view, in cross-section, of a latch assembly including a combination track and divider connected to a rail by a clip according to one embodiment of the present disclosure.

In accordance with the present disclosure, FIG. 1 illustrates a latch or connector assembly 10. The connector assembly 10 includes a latch member or clip 12 including a first arm 14 spaced from a second arm 16 in a generally U-shaped configuration. The latch member 12 is resilient so that the first arm 14 is configured to bias relative to the second arm 16. The latch member 12 includes a first or rear end 18 and an opposite second or front end 20. The first end 18 is configured to be inserted into a cooperating member such as a combination track and divider 22, termed cooperating member. The cooperating member 22 includes an elongated body 24 that defines a channel 26 that is configured to receive the first end 18 of the adapter 12. The channel 26 is defined between a pair of spaced rails 27A and 27B which extend upwardly from the elongated body 24, which can also be defined as a base. The rails 27A and 27B for a track for mounting a pusher assembly (not shown). The cooperating member 22 also includes a divider wall 28 that extends upwardly from the elongated body 24.

Figure 2:
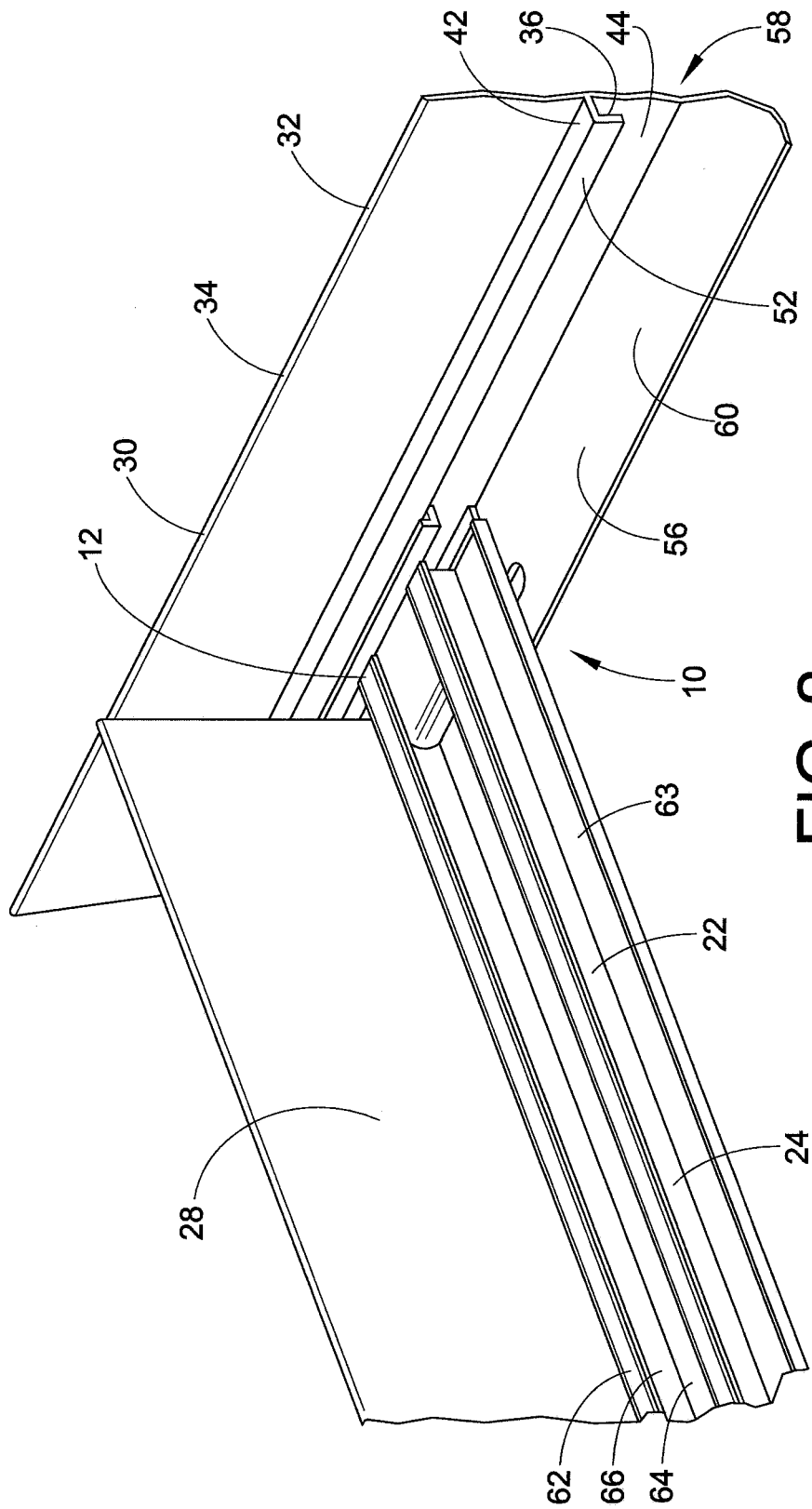
FIG. 2 is an enlarged perspective view of a portion of the latch assembly of FIG. 1.

As illustrated in FIGS. 1 and 2, the latch member 12 connects the cooperating member 22 to an elongated rail 30. The rail 30 includes a first or front side 32 that faces away from the cooperating member 22 and an opposite second or rear side 34 that faces toward the cooperating member 22. In one embodiment, the rail 30, track 22 and divider wall 28 can be made of a material such as a thermoplastic or polymer but can also be made from other materials such as metal alloys. The rail, track and divider wall can also comprise different colors or designs and can be made of a translucent material.

While the cooperating member 22 is illustrated as being a combination track and divider, it should be appreciated that the latch member 12 can be employed with simply a track not having a divider or simply a divider which does not have a track, as long as the divider is suitably configured to accommodate the latch member. For the sake of illustration, only the single cooperating member 22 is shown herein. But, it should be appreciated that there are other known types of cooperating members that are selectively secured to known rails.

The rail 30 includes an elongated member 36 that extends from the second side 34 and defines a space 38 between the rear surface 34 and a portion of the member 36. The elongated member 36, which defines a catch for cooperating with the latch member 12, extends along a lengthwise direction of the rail 30. The elongated member 36 includes a first portion 42 that is directly attached to the second side 34 of the rail 30 and a second portion 44 that depends from the first portion 42. The second portion 44 extends downwardly from the first portion 42 of the elongated member 36 and terminates at an edge 52 that extends lengthwise thereon. The edge 52 can be serrated and functions as the catch which cooperates with the latch member 12. The space 38 is defined by the first portion 42, the second portion 44 and the second side 34 of the rail 30 and is configured to selectively receive an attachment member 46 of the adapter 12.

The attachment member 46 is positioned on the second end 20 of the adapter 12 and extends from the first arm 14 in a transverse orientation. The attachment member 46 is adapted to snugly fit within the space 38 defined by the elongated member 36 and the second side 34 of the rail 30. The attachment member 46 includes a protrusion 48 that extends upwardly from the first arm 14 at the second end 20 of the adapter 12 and is oriented generally perpendicular to the first arm 14. The attachment member 46 and protrusion 48 extend in a widthwise direction relative to the first arm 14 such that the attachment member 46 extends from the first arm 14 in a generally 'T' shaped configuration. The protrusion 48 can include a generally tapered edge that allows the attachment member 46 to better fit within the space 38.

The attachment member 46 includes an abutment surface 50 that is positioned adjacent to the protrusion 48 along a top surface 54 of the first arm 14. The abutment surface 50 is configured to frictionally abut against the edge 52 of the elongated member 36 while the protrusion 48 is snuggly positioned within the space 38. In this position, the adapter 12 securely connects the track 22 to the rail 30.

In one embodiment, the elongated member 36 can include a plurality of spaced teeth 53 defined along the edge 52 and extend downwardly therefrom (see FIG. 6). In this embodiment, the abutment surface 50 can be made of a co-extruded material that is generally more flexible or resilient than the relatively more rigid material of the plurality of teeth positioned or defined along the edge 52. The abutment surface is configured to resiliently receive the plurality of teeth thereby securing the adapter 12 to the rail 30 in a friction fit.

With reference now to FIG. 7, according to another embodiment of the present disclosure, an elongated member 36' can include a second portion 44' that is made of two different coextruded materials. More specifically, a first more rigid coextruded material 70 constitutes the majority of the second portion 44'. However, along a distal edge 52' of the second portion 44' there is provided a more resilient flexible band of material 72. The coextruded material 72 on the edge 52' can be generally as flexible as, or more or less flexible than, the material of the cooperating portion of the latch member latching surface, against which it is compressed. In one embodiment, both the latch member surface and the cooperating surface of the rail can be coextruded.

This disclosure considers various combinations and orientations of how the abutment surface frictionally engages the edge 52, 52' and this disclosure is not limited thereto. For instance, the plurality of teeth 53 can optionally be located along the abutment surface 50 or the edge 52 and include various tapered orientations or materials.

The rail 30 includes a base surface 56 that extends from the second side 34 and is spaced from the elongated member 36. The base surface 56 assists to support the rail 30 along a shelf (not shown). The base surface 56 and the elongated member 36 define a channel 58 along the second side 34 of the rail 30 that is configured to receive the second end 20 of the adapter 12. The first arm 14 and second arm 16 of the adapter 12 are spaced from one another a predetermined distance such that the second arm 16 abuts the base surface 56 of the rail 30 while the attachment member 46 of the first arm 14 is engaged to the elongated member 36.

Figure 3:
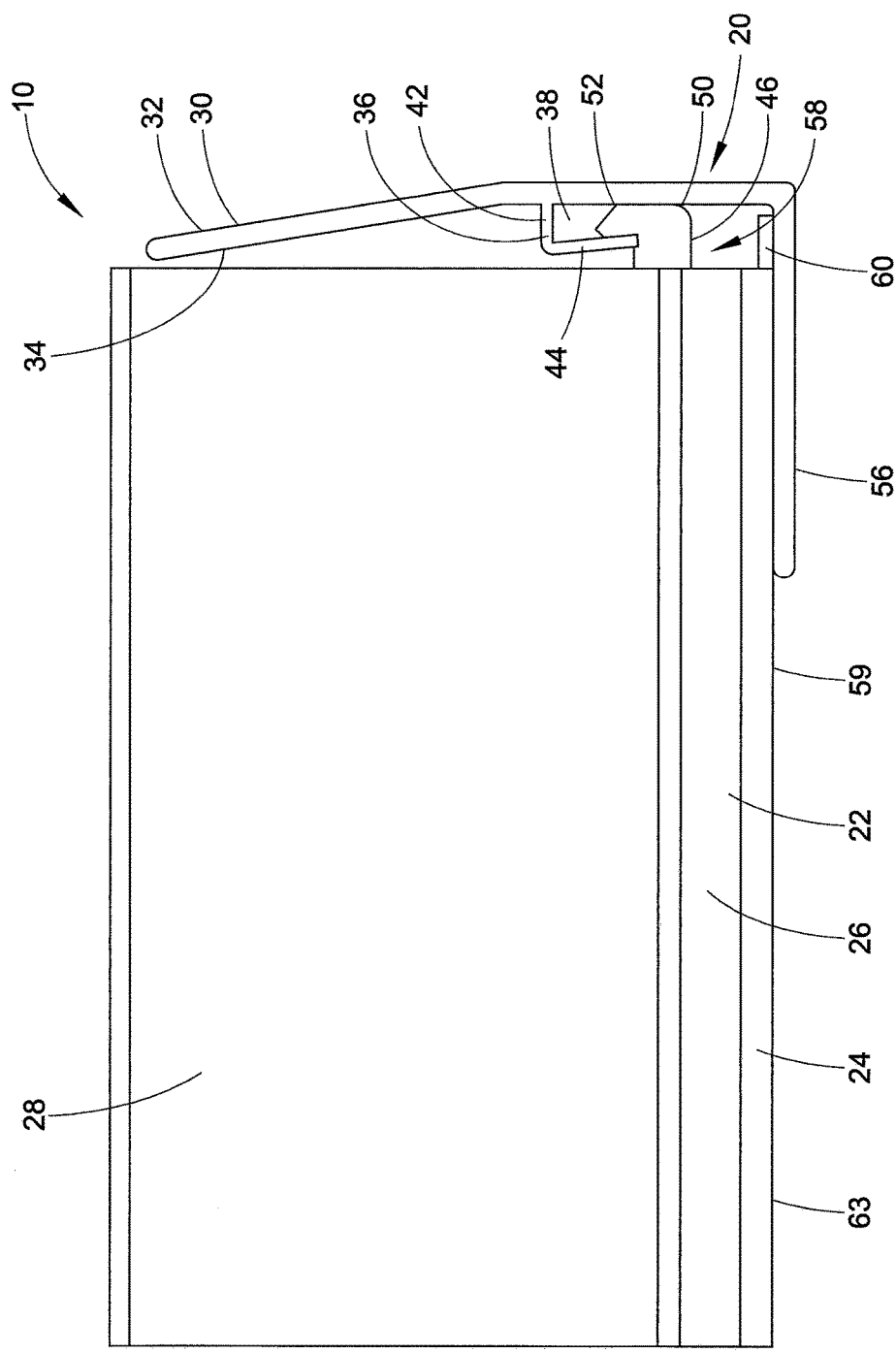
FIG. 3 is an enlarged side elevational view of a forward portion of the latch assembly of FIG. 1.

Additionally, as shown by FIG. 3, the elongated body 24 of the cooperating member 22 includes a bottom side 59 that can abut the base surface 56 when the cooperating member is attached to the rail 30. Optionally, as illustrated by FIGS. 2 and 5, a support wing 63 can extend from the bottom side 59 of the track 22 to maintain merchandise in an upright position.

Figure 4:
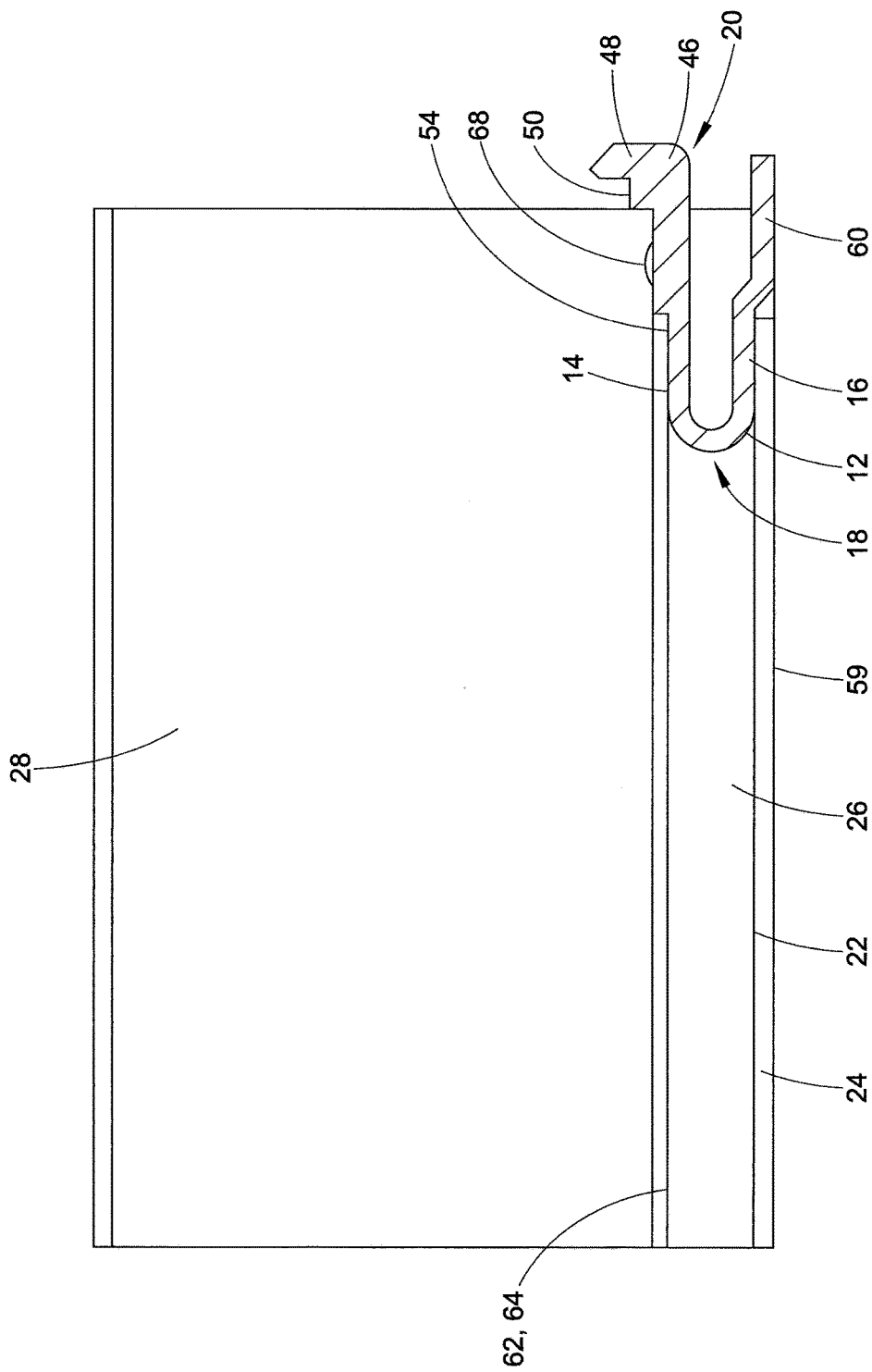
FIG. 4 is a cross sectional view of the combination track and divider of FIG. 1, when disconnected from the rail and illustrating a latch member according to the present disclosure.

FIG. 4 illustrates that the adapter 12 is received within the channel 26 of the track 22 and the second arm 16 rests on the bottom side 59 therein. The second arm 16 includes a base platform 60 that is configured to abut against the base surface 56 of the rail 30 as illustrated by FIGS. 1 and 3. In this embodiment, the base platform 60 can extend in a widthwise direction relative to the second arm 16 such that the base platform 60 extends from the second arm 14 in a generally 'T' shaped configuration. As illustrated by FIG. 5, in one embodiment, a length (L1) of the attachment member 46 can be approximately the same as a length (L2) of the base platform 60. The lengths L1 and L2 are greater than a width (W1) of the first and second arms 14, 16 of the adapter 12. This configuration provides structural stability to the connection assembly 10 as the track 22 is secured to the rail 30 in a generally transverse orientation. The 'T' shaped orientation of the adapter 12 provides stability to the track 22 as the divider wall 28 has increased ability to withstand side loads imposed thereon while maintaining an upward orientation. Additionally, unintended axial movement of the track 22 relative to the rail 30 is limited.

FIGS. 2 and 5 show the elongated body 24 of the track 22 includes the pair of spaced rails 27A and 27B and the channel 26 that extends in a lengthwise direction along the elongated body 24. The first arm 14 of the adapter 12 fits between and abuts against a bottom surface of the first and second rails 27A, 27B when the adapter 12 is received within the channel 26 of the track 22. The first arm 14 includes a press or contact surface 68 that is configured to be pressed by an associated user to bias the first arm 14 towards the second arm 16 to selectively disconnect the attachment member 46 of the latch member 12 from the edge 52 of the elongated member 36 along the rail 30. The press surface 68 is located along the top surface 54 of the first arm 14 and generally aligns within and is accessible through the channel 26.

In one embodiment, the latch member 12 is mounted to the cooperating member 22 simply by a friction fit. However, if desired, the latch member 12 can be attached within the channel 26 of the cooperating member 22 by conventional fasteners, adhesives, or by at least one pair of detents and recesses positioned along the second arm 16. The connection of the adapter 12 to the track 22 can be accomplished in various ways and this disclosure is not limited.

The described configuration of this connection assembly 10 allows the user to connect the cooperating member 22 to the rail 30. As the press surface 68 is pressed, the first arm 14 is moved towards the second arm 16 to position the attachment member 46 near the base platform 60 of the second arm 16. The second end 20 of the latch member 12 is then positioned adjacent to the second or rear side 34 of the rail 30 and inserted within the channel 58 defined by the elongated member 36 and the base surface 56. The base platform 60 and the bottom side 59 of the cooperating member 22 abut the base surface 56 of the rail 30. As the press surface 68 is released, the first arm 14 returns to its unflexed position and biases away from the second arm 16. It returns to a neutral position such that the protrusion 48 of the attachment member 46 is received within the space 38 defined by the elongated member 36 and second side 34 of the rail 30. The edge 52 of the elongated member 36 at least partially frictionally abuts the abutment surface 50 of the attachment member 46 along the first arm 14 thereby connecting the cooperating member 22 to the rail 30 in a transverse configuration.

Additionally, the user can press the press surface 68 of the adapter 12 to bias the first arm 14 towards the second arm 16 and disengage the edge 52 of the elongated member 36 from the abutment surface 50 while the second end 20 of the adapter 12 remains within the channel 58 of the rail 30. The cooperating member 22 and adapter 12 can then be moved axially relative to the rail 30 to adjust the position of the member along the shelf platform. This allows a merchant to rearrange the position of the cooperating member 22 without having to completely remove the cooperating member from the rail 30 or having to remove other cooperating members that are attached to the same rail.

It should be appreciated that the cooperating member 12 and the rail 30 can be made of different materials, as can the latch member 12. For example, the rail 30 can be made of a suitable metallic material, whereas the latch member 12 is made of a first type of thermoplastic material while the cooperating member 22 is made of a second type of thermoplastic material. Alternatively, both the cooperating member 22 and the rail 30 can be made of a first type of thermoplastic material, while the latch member is made of a second type of thermoplastic material. In addition, both the rail 30 and the latch member 12 can be made of coextruded thermoplastic materials having different material properties on various surfaces of the latch member and the rail.

Figure 8:
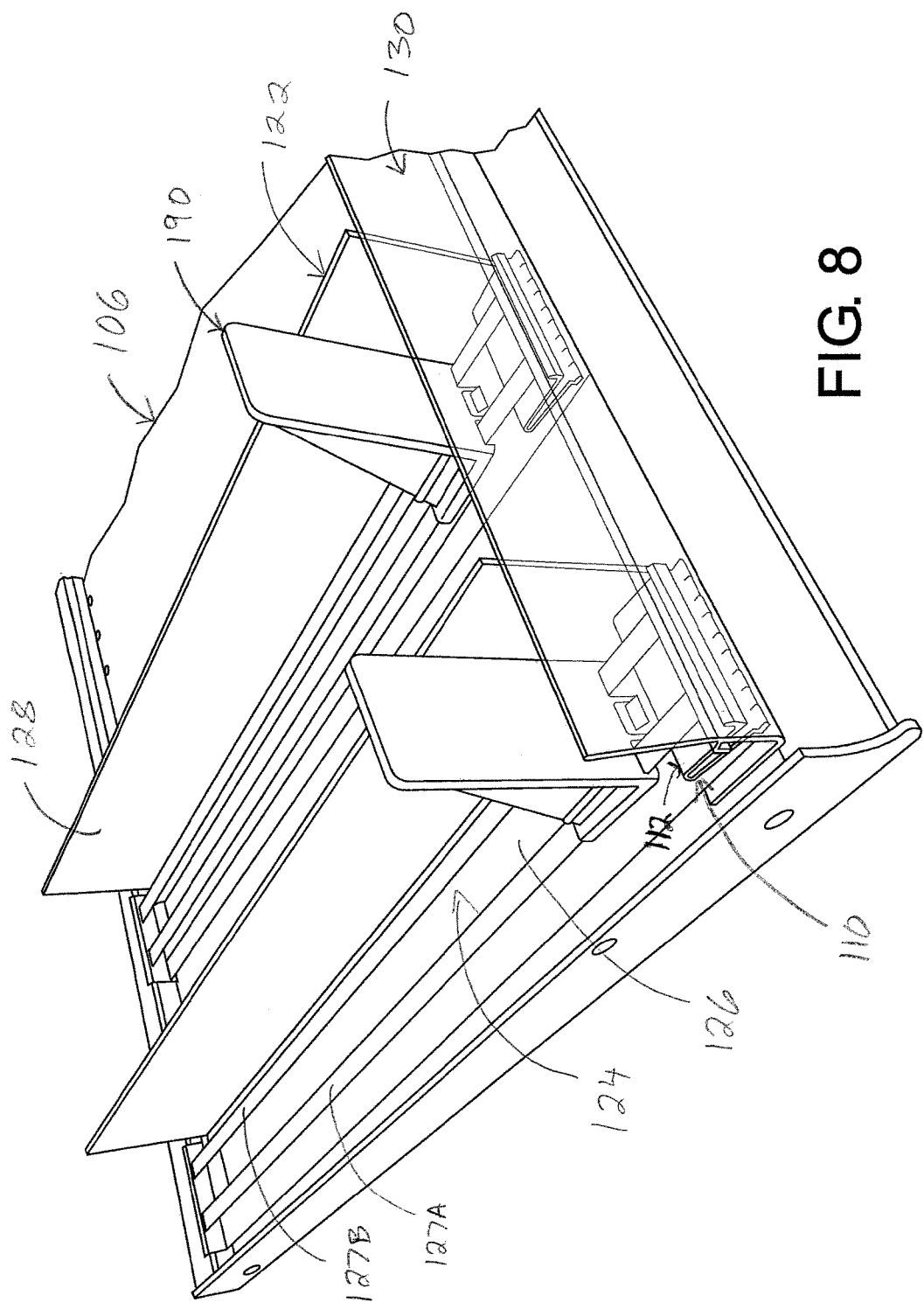
FIG. 8 is a perspective view of a latch assembly including a cooperating member in the form of a combination track and divider connected to a rail by a clip according to another embodiment of the present disclosure.
Figure 10:
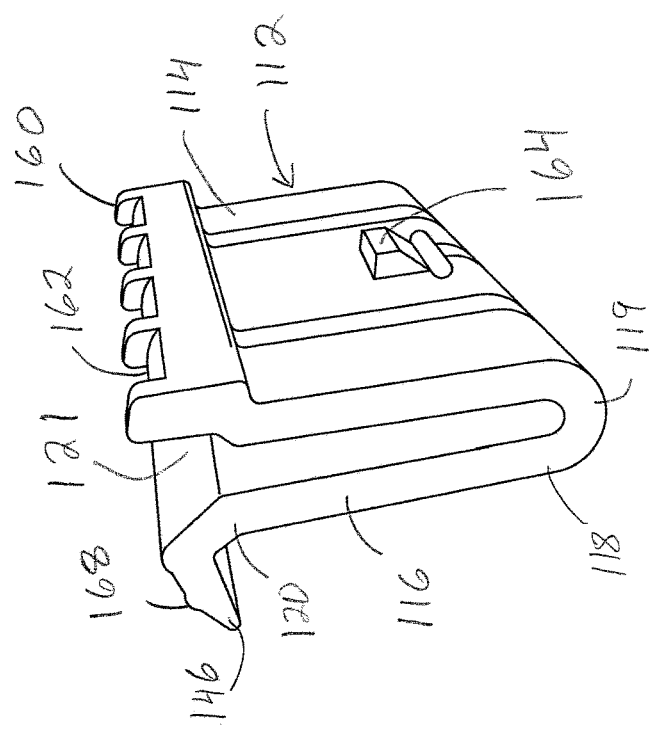
FIG. 10 is an enlarged perspective view of a clip of the latch assembly of FIG. 8.

With reference now to FIG. 8, a connector assembly 110 according to another embodiment of the present disclosure is shown as being used with a merchandising system mounted on a shelf 106. The connector assembly 110 includes a latch member or clip 112. With reference now to FIG. 10, the latch member or clip includes a first arm 114 and a second arm 116, as well as a rear end 118 comprising a connecting portion or bridge portion 119 and a front end 120 defining a slot 121. The latch member or clip is adapted to selectively engage a cooperating member 122 as illustrated in FIG. 8. In this embodiment, the cooperating member includes an elongated body 124 on which is defined a channel 126 which separates a pair of rails 127A and 127B. The cooperating member also includes a divider 128 in this embodiment.

Figure 9:
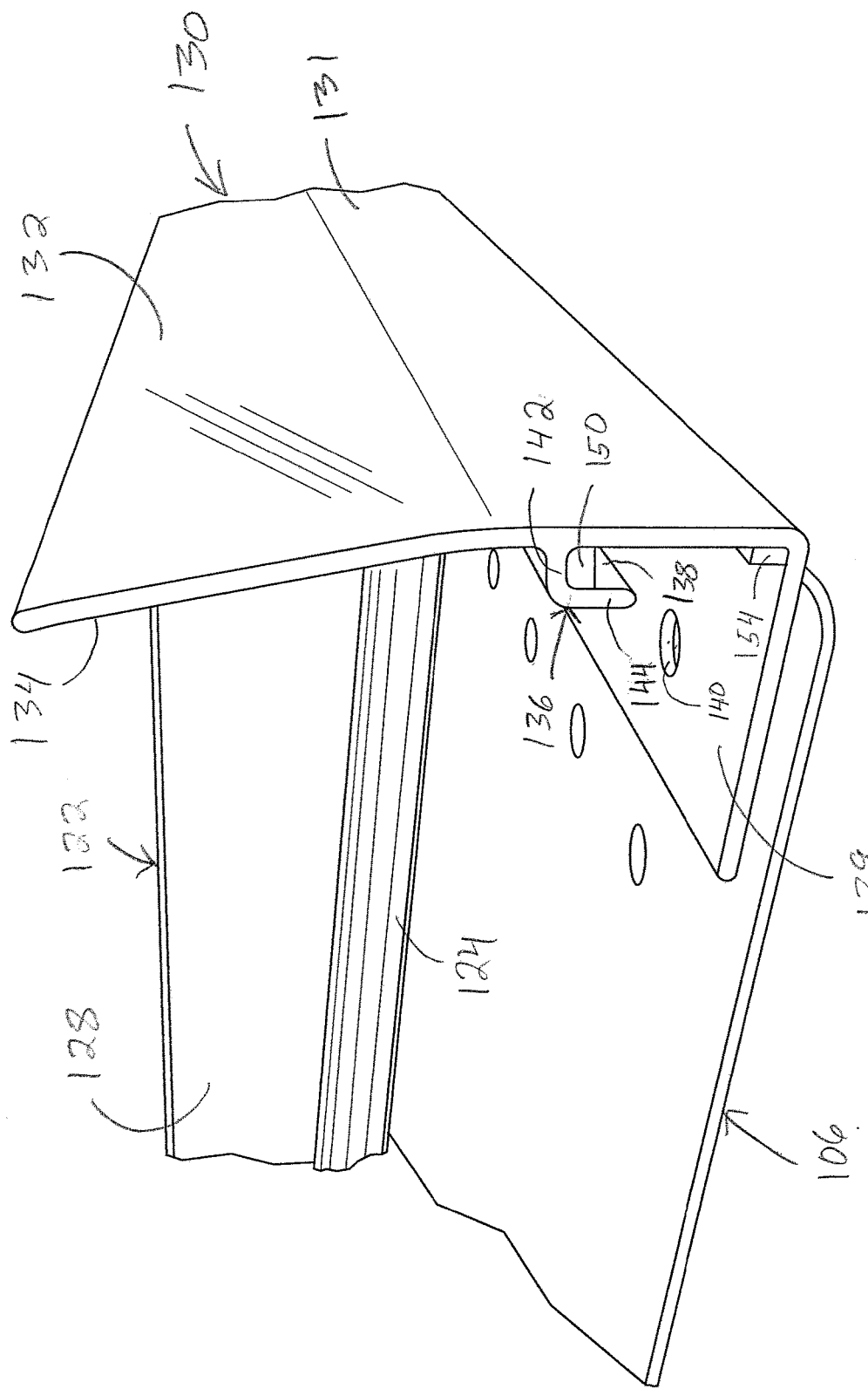
FIG. 9 is an enlarged perspective view of a portion of a merchandising assembly of FIG. 8 illustrating the rail.

With reference now also to FIG. 9, the latch member 112 is adapted to selectively engage the cooperating member 122 with a front rail 130. The front rail includes a vertical section 131 on which is defined a front face 132 and a rear face 134. An L-shaped flange 136 extends from the rear face so as to define a space or slot 138 between the vertical section rear face and a portion of the flange. The front rail 130 also includes a horizontal section 139 which extends rearwardly from the vertical section 131. Defined in the horizontal section is at least one aperture 140 through which a suitable fastener can extend so as to selectively engage the front rail with the shelf 106. The L-shaped flange 136 includes a first leg 142 and a second leg 144 which extends in the direction generally normal to the direction of the first leg. The first leg 142 extends in a direction generally normal to a plane of the front rail vertical section 131 and parallel to a plane of the front rail horizontal section 139. On the other hand, the second leg 144 extends in a plane generally parallel to the plane of the front rail vertical section and generally perpendicular to the plane of the front rail horizontal section 139. As can be seen in FIG. 9, the flange second leg 144 terminates well short of the front rail horizontal section 139.

With continued reference to FIG. 9, extending in the slot 138 is a first layer 150 of a flexible thermoplastic material. In one embodiment, the flexible thermoplastic material can be a flexible polyvinyl chloride (FPVC) which has a Shore A hardness of less than 75 as measured according to ASTM Standard D2240 on a 15 second delay. In one embodiment, the Shore A hardness of the FPVC material is 70. It should be appreciated that there are numerous suppliers of such a material known in the industry.

In one embodiment, the rail 130 is extruded from a suitable known thermoplastic material and the first layer 150 is coextruded with the rail 130. Such coextrusion of the layer 150 with the rail 130 is advantageous because it simplifies the manufacturing process for the front rail.

If desired, a second layer 154 of coextruded material can also be provided on the rear face 134 of the rail 130 as is illustrated in FIG. 9. This layer of coextruded material can be provided at the intersection of the vertical section 131 and the horizontal section 139 of the rail 130. The second layer 154 can be made from the same material as the first layer 150. Of course, it should be appreciated that other locations on the rail for any number of such layers can also be provided.

With reference now again to FIG. 10, the latch member or clip 112 can include a protrusion 146 which can extend from one of the arms 114 and 116 of the clip 112. In the embodiment illustrated, the protrusion extends from the second arm 116. The protrusion 146 extends in a direction which is generally normal to or perpendicular to a plane of the second arm. However, other orientations of the protrusion 146 are also contemplated.

Figure 11:
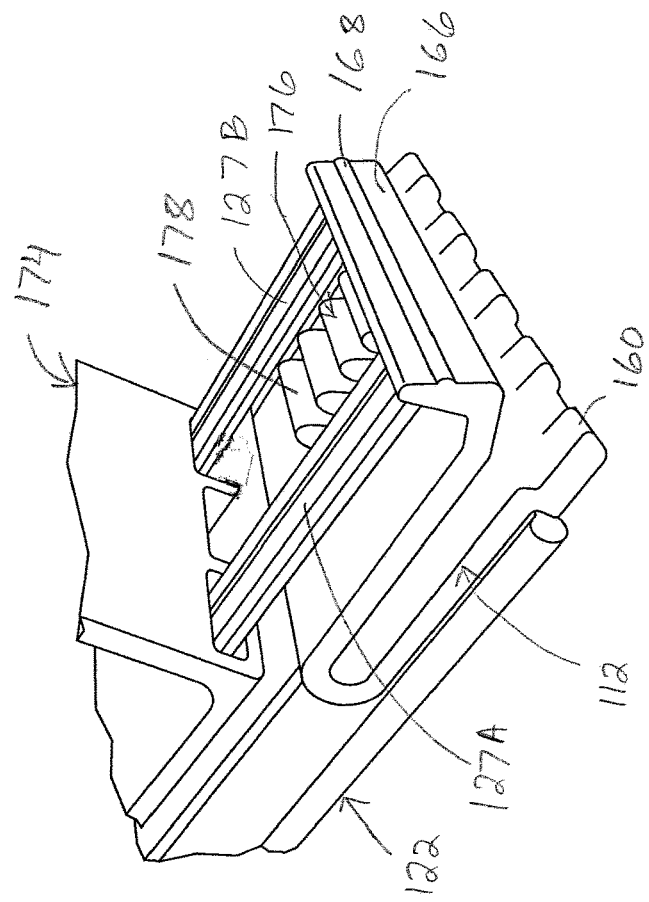
FIG. 11 is a perspective view of the clip of FIG. 10 attached to a cooperating member of the type illustrated in FIG. 8.

With reference now to FIG. 11, one or more teeth 160 can be defined on and extend forwardly from the first arm 114 of the clip 112. In the embodiment illustrated, the protrusion 146 engages the first layer of coextruded material 150 located on the front rail 130, whereas the teeth 160 engage the second layer 154 of coextruded material provided on the front rail. In this way, when the clip is in engagement with the two layers of coextruded material, the cooperating member 120 with which the clip is engaged as is illustrated in FIG. 11 is retarded by frictional engagement of the mentioned parts of the rail and clip from sliding laterally along the length of the front rail 130. Defined on a front face 166 of the protrusion 146 can be a rib 168. The rib can contact the rear face 134 of the vertical section 131 of the front rail in order to provide a contact or abutment surface between the clip 112 and the rail 130. The rib 168 contacts the rear surface 134 of the rail and provides another frictional engagement surface to retard any sideward sliding motion of the cooperating member with which the clip is engaged in relation to the rail 130.

As best illustrated in FIG. 11, an engagement surface 176 can be defined on the second arm 116 of the clip 112. In one embodiment, the engagement surface comprises one or more ribs 178 which are adapted for contact by a digit of a store employee tasked with selectively moving the cooperating member in relation to the front rail 130. Pushing down on the second arm 116 against the inherent resiliency of the thermoplastic material from which the generally U-shaped clip 112 is made will disengage the protrusion 146 from the first layer of coextruded material 150 located in the slot 138 thereby reducing the frictional contact between the clip 112 and the rail 130. This allows the store employee to then more easily move the cooperating member in relation to the rail 130 in a lateral direction. To further aid such movement, the cooperating member can be lifted somewhat away from the subjacent shelf surface near the rear end of the cooperating member by the store employee. Doing so will disengage the teeth 160 of the clip 112 from the second layer of coextruded material 154 defined on the rail 130, making it yet easier to move the cooperating member laterally in relation to the rail 130.

With reference again to FIG. 8, in one embodiment, the cooperating member can also include a pusher assembly 190. It is well known in the art that pusher assemblies can be resiliently biased towards a front end of a shelf by a coil spring or a suitable biasing member. FIG. 8 illustrates an embodiment in which the rail 130 is a front rail.

Figure 12:
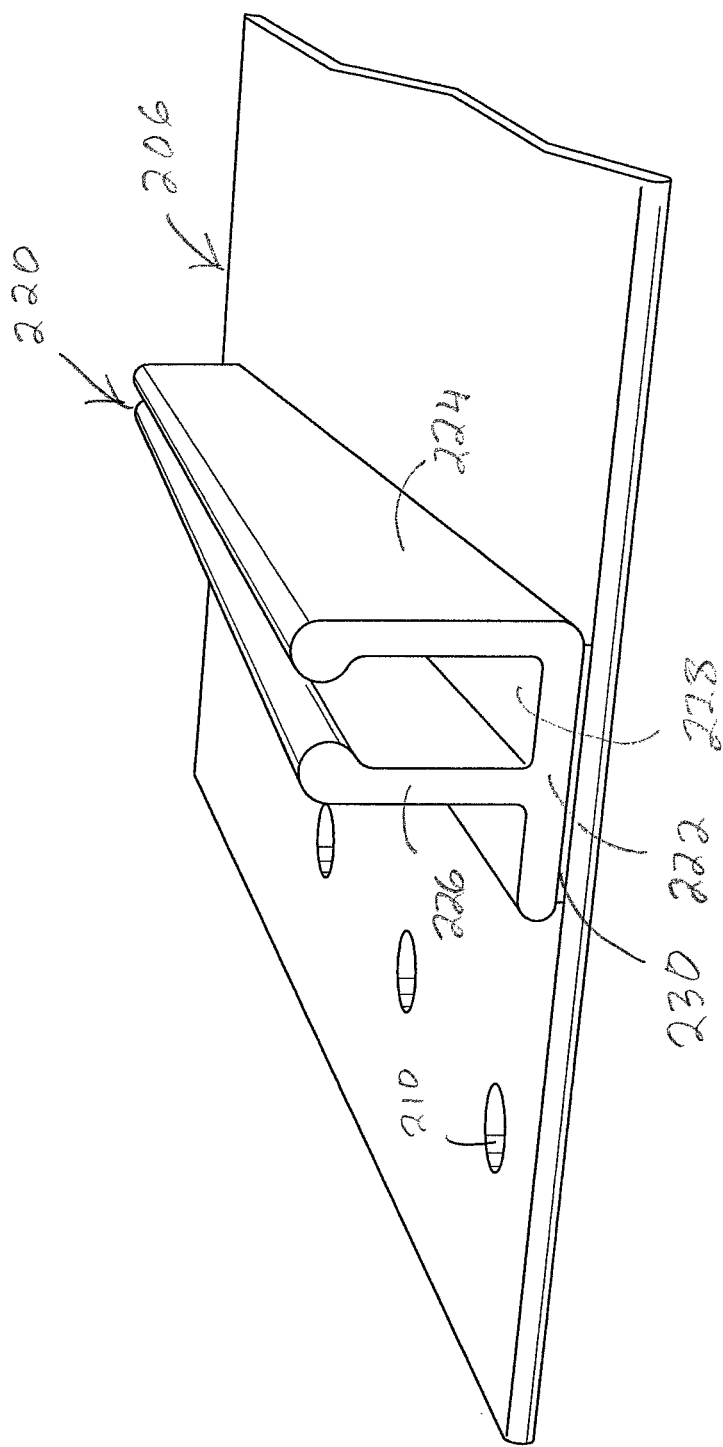
FIG. 12 is an enlarged perspective view of a rear rail which could be used with the embodiment of FIG. 8.

With reference now to FIG. 12, if desired, a rear rail 220 can also be provided. The provision of such a rear rail is, however, optional. As mentioned, the merchandising system can also include a rear rail or back U-channel 220. In one embodiment, this comprises a base 222 and spaced first and second legs 224 and 226 extending from the base so as to define between them a channel 228. An adhesive layer of material 230 can be employed to secure the back U-channel 220 to a shelf 206. With reference now to FIG. 13, a back clip 230 can comprise a first portion 240 including a first leg 242 having a tapered end 243 and a connecting portion 244 which leads to a second leg 246. A slot 248 is defined between the two legs so that an upside down U-shaped first portion is defined. The clip 236 also includes a second portion 260. With reference now to FIG. 14, the second portion 260 comprises a base wall 262 and spaced first and second side walls 264 and 266 extending from the base. The base and the two side walls cooperate to define a mouth 268. The mouth is meant to accommodate a rear end of the cooperating member, such as the member 122 illustrated in FIG. 8. As shown in FIG. 13, a locking bump 276 can be provided on a bottom face of the base wall 262 of the clip 236 so as to selectively engage one of the holes 210 in the shelf 206 and thereby retard lateral movement of the clip 236 and the cooperating member mounted therein in relation to the rear rail 220.

Disclosed has been a latch or connector assembly that is adapted to attach a cooperating member to a rail along a merchandising shelf. The connector assembly includes a clip having a first end and an opposite second end such that the first end is adapted to be attached to the rail and the second end is configured to be selectively attached to the cooperating member. The adapter includes a first arm and a second arm, the first arm is spaced from a second arm such that the first arm can be resiliently biased relative to the second arm. An attachment member extends from the first arm and is configured to selectively connect to the rail. A press surface or engagement surface is configured to be pressed by an associated user to bias the first arm relative to the second arm to selectively connect the attachment member to the rail.

Also disclosed has been a connector assembly that is adapted to attach a track or a divider, or a combination track and divider, to a rail mounted to a merchandising shelf assembly. The merchandising shelf assembly comprises the shelf with a rail configured to be positioned along a front edge of the shelf, the rail having a first side adapted to be viewed by customers and an opposite second side to which is mounted an elongated cooperating member. The clip or attachment member is configured to attach the cooperating member along the second side of the rail.

The connector assembly includes a clip having a first end and an opposite second end such that the first end is adapted to be attached to the cooperating member and the second end is configured to be selectively attached to the rail. The clip includes a first arm and a second arm, the first arm is spaced from a second arm such that the first arm can be resiliently biased relative to the second arm. An attachment member extends from the first arm and is configured to selectively connect to the rail. The clip is mounted to the cooperating member.

Also disclosed has been a method for connecting a cooperating member to a rail on a shelf platform with a clip. The clip is attached within a channel of the cooperating member. The clip can be U-shaped and includes a first arm spaced from a second arm and an abutment surface is defined on at least one of the first arm and the second arm. The first arm is normally biased away from the second arm. The clip and cooperating member can be positioned on the shelf adjacent to a rear side of the rail such that the attachment member extending from the first arm is aligned with an elongated member extending from the rear side of the rail. The first arm is pushed towards the second arm to at least partially disengage the clip from the rail. When released, a portion of the rail is again frictionally abutted by an abutment surface of the clip.

The exemplary embodiments of the disclosure have been described herein. Obviously, modifications and alterations will occur to others upon reading and understanding the preceding detailed description. It is intended that the instant disclosure be construed as including all such modifications and alterations insofar as they come within the scope of the appended claims or the equivalents thereof.

The invention claimed is:

1. A connector assembly that is adapted to selectively attach a cooperating member to a rail of a merchandising shelf, the connector assembly comprising:
   a U-shaped clip including a first end and an opposite second end such that the first end is adapted to be selectively attached to the cooperating member and the second end is adapted to be selectively attached to the rail, the clip including a first arm, a second arm and a bridge portion joining the first arm to the second arm, with the second arm of the U-shaped clip engaging the cooperating member, wherein the clip comprises a resilient material and wherein the first arm is spaced from the second arm such that the first arm is movable in relation to the second arm;
   a protrusion extending in a direction generally perpendicular to a plane of the first arm, the protrusion including a section configured to selectively cooperate with a first engagement portion of the rail; and
   wherein the first engagement portion of the rail includes a layer of a flexible thermoplastic material having a Shore A hardness of less than 75.

2. The connector assembly of claim 1 wherein the rail includes:
   a flange extending rearwardly from a rear face of the rail;
   a slot defined between the flange and a rear face of a vertical section of the rail; and
   wherein the first engagement portion is positioned in the slot.

3. The connector assembly according to claim 2 wherein the merchandising shelf comprises a shelf platform with the rail configured to be positioned along a front edge of the shelf platform, the rail including a front face adapted to be viewed by potential customers.

4. The connector assembly of claim 1 wherein the clip is a unitary, one-piece body.

5. The connector assembly of claim 1 wherein the second arm includes a front end comprising at least one tooth.

6. The connector assembly according to claim 5 wherein the second arm front end comprises a plurality of spaced teeth.

7. The connector assembly of claim 5 wherein the rail further comprises a second engagement portion space from the first engagement portion, wherein the second engagement portion of the rail includes a layer of flexible thermoplastic material having a Shore A hardness of less than 75.

8. The connector assembly according to claim 1 wherein the rail first engagement portion includes a material that is co-extruded with a material of the rail.

9. The connector assembly according to claim 1 wherein the rail includes a vertical section and a horizontal section that is connected to the vertical section and wherein the horizontal section is configured to support the rail on the merchandising shelf.

10. The connector assembly according to claim 1, wherein the first arm is oriented generally parallel to the second arm in an unbiased position of the clip.

11. A connector assembly that is adapted to selectively attach a cooperating member to a rail of a merchandising shelf, comprising:
    an elongated rail including a surface;
    a layer of a flexible thermoplastic material having a Shore A hardness of less than 75 mounted to the rail surface;

a U-shaped clip including a first arm, a bridge and a second arm wherein the second arm of the clip is mounted to the cooperating member;

a protrusion extending from one of the first and second arms of the clip; and wherein the protrusion is adapted to engage the layer of flexible thermoplastic material on the surface of the rail to retard a movement of the cooperating member along a length of the elongated rail.

12. The connector assembly of claim 11 wherein a press surface is defined on one of the first and second arms of the clip, the press surface being configured to be contacted by an associated user in order to urge the first arm toward the second arm.

13. The connector assembly of claim 11 wherein the protrusion is mounted to the first arm and extends in a direction generally perpendicular to a plane of the first arm.

14. The connector assembly of claim 13 wherein the rail includes a flange and a slot is defined between a rear face of the rail and the flange such that the layer of flexible thermoplastic material is located in the slot and wherein the protrusion extends into the slot.

15. The connector assembly of claim 11 wherein the protrusion is mounted to one of the first and second arms and comprises at least one tooth.

16. The connector assembly of claim 15 wherein the rail includes a rear face on which is located the layer of flexible material and wherein the at least one tooth contacts the layer of flexible material.

17. The connector assembly of claim 11 wherein the clip is a unitary, one-piece body.

18. The connector assembly according to claim 11 wherein the rail includes a vertical section and a horizontal section that extends from the vertical section and wherein the horizontal section is configured to support the rail on the merchandising shelf.

19. The connector assembly according to claim 11, wherein the first arm is oriented generally parallel to the second arm in an unbiased position of the clip.

* * * * *